Patented Sept. 12, 1922.

1,429,131

UNITED STATES PATENT OFFICE.

SAMUEL FIELD, OF LONDON, ENGLAND, ASSIGNOR TO THE METALS EXTRACTION CORPORATION, LIMITED, OF LONDON, ENGLAND.

PURIFICATION OF METALLIC SOLUTIONS.

No Drawing. Application filed June 26, 1919. Serial No. 306,874.

*To all whom it may concern:*

Be it known that I, SAMUEL FIELD, a subject of the King of England, residing in London, England, have invented certain new and useful Improvements in the Purification of Metallic Solutions, of which the following is a specification.

The present invention relates to improvements in the purification of metallic salt solutions from foreign metals.

According to this invention the process for the purification of metallic salt solutions from foreign metals comprises immersing in the solution two metals in contact, neither of which is identical with the metal or metals to be removed from the solution, and which are preferably widely separated in the electro-chemical series. One of the metals may be more electro-negative than the impurities to be removed and in the preferred manner of carrying the invention into effect the other metal is that whose salt solution is to be purified.

In the electro-chemical series the metals stand approximately in the following order: Magnesium, aluminium, manganese, zinc, cadmium, iron, cobalt, nickel, tin, lead, arsenic, copper, antimony, bismuth, mercury, silver, platinum and gold, and in purifying a solution of one of these metals, according to the present invention, there is immersed therein two of the metals which fulfil the conditions above stated and which are preferably separated as widely as possible in the series. While it is generally preferred that one of the two metals should be the same as that whose solution is undergoing purification, a more positive metal than the latter may be employed in those cases where its dissolution will not be detrimental. For example, aluminium may be used in the purification of zinc solutions according to this invention because this metal may be subsequently removed simultaneously with any iron impurity and further the presence of aluminium in such solutions is not detrimental to the electrolytic deposition of zinc. On the other hand, the introduction of iron is to be avoided and therefore we do not make use of this particular metal in the purification of zinc solutions.

A process has been described for separating copper and nickel from alloys of these metals, which comprises the treatment of a nickel sulphate solution with a nickel-copper alloy, whereby copper is very largely cemented out of the solution, but this process does not fulfil that feature of the present invention, according to which copper would not be one of the metals used for removing that metal from a copper-containing solution of a nickel salt.

In the prefered manner of carrying the invention into effect one of the two metals is the same as that whose salt solution is to be purified, and the other metal is lower in the electro-chemical series. Mercury has been found to be particularly advantageous as one of the metals to be employed according to the invention, and the latter may be conveniently illustrated by reference to its application to the purification of zinc solutions, the process being especially applicable to the purification of solutions of this metal for the subsequent electro-deposition of the zinc, such for example as zinc sulphate solutions, resulting from the treatment of zinc ores or zinc-containing materials with sulphuric acid, or with the acid liquors obtained during the process of electro-deposition.

As is well-known to obtain a successful deposition of zinc by electrolysis, the zinc sulphate liquors must be of a high order of purity. Impurities such as copper, cadmium, iron, antimony, arsenic, nickel, cobalt and bismuth must be eliminated or substantially so, as they affect adversely and very seriously, the deposition both qualitatively and quantitatively.

By the process according to the present invention, it is found possible to remove most of these impurities in a single operation.

Copper and similar very electro-negative impurities have hitherto been removed by tube-milling with coarse zinc, such for example as zinc balls, or by agitating the solutions with zinc dust. In the cases of nickel and cadmium the action of zinc dust is slow and necessitates the special conditions set forth in co-pending applications, while for the removal of cobalt the use of zinc dust is impracticable.

In purifying the solutions, such for example as zinc sulphate solutions, according to the present invention, there is preferably immersed in the acid solutions, amalgamated zinc, amalgamated aluminium or an amalgamated alloy of these or other electro-positive metals, such for example as magnesium, and preferably also the solutions are treated warm.

The zinc, aluminium or alloys thereof, may be in the form of filings, turnings, granules, sheet or other convenient form which offers a large surface, and they are amalgamated by first cleaning (if necessary) and subsequently immersing them in a solution of a mercury compound such for example as mercuric chloride, mercuric nitrate or mercuric sulphate, from which the mercury is deposited as a thin film upon the metals immersed.

For purifying zinc sulphate solutions, such for example as those obtained by the treatment of a zinc ore, which may be calcined if necessary, with sulphuric acid or the acid liquors from the electrolytic cells, the amalgamated metal is rinsed to free it from excess of the mercury solution, and is introduced into the crude zinc sulphate liquor, the temperature being preferably maintained at from 70°–100° C. When amalgamated sheets are used these may suitably be disposed in frames arranged in the purifying tank so that maximum contact of the solution and plates is assured. Again, when amalgamated turnings are employed, these may conveniently be held in a perforated case or box to which motion can be imparted in the solution. The solution may also be gently stirred. Alkaline liquors are not used and it is preferred to use the zinc solutions acidulated, with, for example about 0.1% of sulphuric acid.

Copper, arsenic, antimony, bismuth, cadmium, nickel and cobalt present are precipitated, and collect on the amalgamated metal in the form of a metallic mud, which can be simply and periodically removed. When the amalgamated metal is in the form of sheets, the mud may be removed by scraping, it being readily detached. The plates may be re-amalgamated from time to time as may be found necessary.

When the metals are used in the more substantial form, such for example as sheets, they may be amalgamated by direct contact with mercury, in which case a somewhat lower temperature is found to be effective. This latter method, however, needs more careful handling in order to avoid undue loss of mercury.

The mercury contained in the metallic mud is readily recoverable either as metal or as a solution which is again available for amalgamation purposes.

Any iron present may not be precipitated by the action of the amalgamated plates, but it may be removed by any method usually employed for this purpose either prior to or subsequent to the process described above.

When aluminium is one of the metals employed, some aluminium goes into solution, but it may be removed concurrently with any iron impurity. A small proportion of aluminium, however, in the zinc solutions is not detrimental to the electrolytic deposition of zinc.

The solutions purified by the process described in this invention are particularly suitable for the very efficient electro deposition of zinc.

What I claim as my invention and desire to secure by Letters Patent is:—

1. The process for the purification of a zinc salt solution from base metallic impurities, which comprises immersing in the solution zinc and another metal in contact, neither of which is identical with the metallic impurity to be precipitated and one of which is lower than zinc in the electro-chemical series.

2. The process for the purification of a zinc salt solution from nickel and cobalt, which comprises immersing in the solution two metals in contact, one of which is zinc and the other is a metal other than nickel or cobalt and lower than zinc in the electro-chemical series.

3. The process for the purification of a zinc salt solution from nickel and cobalt, which comprises immersing amalgamated zinc in the solution.

4. The process for the purification of a zinc salt solution from nickel and cobalt, which comprises immersing amalgamated zinc in the acidified solution.

5. The process for the purification of a zinc salt solution from nickel and cobalt, which comprises immersing amalgamated zinc in the acidified solution maintained at a temperature of 70°–100° C.

6. The process for the purification of a zinc salt solution from base metallic impurities, which comprises immersing in the solution an amalgamated metal above and including zinc in the electro-chemical series.

7. The process for the purification of acidified zinc salt solution from base metal impurities, which comprises immersing in the solution an amalgamated metal above and including zinc in the electro-chemical series, the solution being maintained at a temperature of from 70° to 100° C.

8. The process for the purification of a zinc salt solution from nickel and cobalt, which comprises immersing in the solution an amalgamated metal above and including zinc in the electro-chemical series.

9. The process for the purification of acidified zinc salt solution from nickel and cobalt, which comprises immersing in the solution an amalgamated metal above and including zinc in the electro-chemical series, the solution being maintained at a temperature of from 70° to 100° C.

In testimony whereof I affix my signature.

SAMUEL FIELD.